United States Patent [19]
Yamamoto et al.

[11] Patent Number: 4,658,788
[45] Date of Patent: Apr. 21, 1987

[54] IGNITION SYSTEM FOR INTERNAL COMBUSTION ENGINES

[75] Inventors: Noboru Yamamoto, Kariya; Katsuhisa Mase, Aichi; Motoshi Kawai, Anjo; Yoshiyuki Miyase, Okazaki; Takeshi Matsui, Toyohashi, all of Japan

[73] Assignee: Nippondenso Co., Ltd., Kariya, Japan

[21] Appl. No.: 810,291

[22] Filed: Dec. 18, 1985

[30] Foreign Application Priority Data

Jan. 21, 1985 [JP] Japan .................................. 60-9614
Jan. 21, 1985 [JP] Japan .................................. 60-9615

[51] Int. Cl.⁴ ............................................. F02P 5/155
[52] U.S. Cl. .................................... 123/418; 123/424; 123/618; 123/644; 123/652
[58] Field of Search ............... 123/416, 417, 418, 424, 123/427, 609, 644, 652

[56] References Cited

U.S. PATENT DOCUMENTS

| 4,131,098 | 12/1978 | Daniels et al. ................... 123/424 X |
| 4,280,461 | 7/1981 | Okuda et al. ........................ 123/418 |
| 4,373,488 | 2/1983 | Neuhalfen ............................ 123/418 |
| 4,411,246 | 10/1983 | Sugiura ............................... 123/644 |
| 4,519,038 | 5/1985 | Matsui et al. .................... 123/418 X |

FOREIGN PATENT DOCUMENTS 0195867 12/1982 Japan .
0188923 11/1983 Japan .

Primary Examiner—Willis R. Wolfe, Jr.
Attorney, Agent, or Firm—Cushman, Darby & Cushman

[57] ABSTRACT

In an ignition system for an internal combustion engine, a signal generator generates a given ac signal in synchronism with the rotation of the engine and a waveform reshaping circuit reshapes the waveform of the ac signal from the signal generator thus generating a pulse signal. An ignition timing control circuit is responsive to the pulse signal from the waveform reshaping circuit to control the timing of ignition of an ignition coil in which a primary current is switched on and off in accordance with the pulse signal.

4 Claims, 10 Drawing Figures

IGNITION SYSTEM FOR INTERNAL COMBUSTION ENGINES

BACKGROUND OF THE INVENTION

The present invention relates to an ignition system for internal combustion engines which is capable of electronically controlling the ignition timing of an engine.

Ignition systems have been known in the past in which an alternating current periodically repeated at a predetermined position (e.g., the top dead center) of each cylinder of an engine is reshaped to produce a reference pulse signal whose leading edge is shifted in an ignition timing advancing direction with increase in the engine speed, so that a desired ignition timing is computed in terms of a time and determined at an elapsed time point from the leading edge of the reference pulse signal thereby controlling the ignition timing with the simple construction (e.g., Japanese Unexamined Publication No. 195867/82).

Other ignition systems have been known in which in order to prevent any erroneous operation due to a noise signal superposed on an ac signal from an electromagnetic pickup, a pump-up circuit is provided so that at times of leading-edge and trailing-edge transitions of a pulse signal generated from a waveform reshaping circuit by reshaping the ac signal, biases each increasing to the maximum just after the transition and then decreasing gradually are alternately fed back in such directions which facilitate these transitions (e.g., Japanese Unexamined Publication No. 188923/83).

However, the former of these conventional systems is disadvantageous in that since the threshold voltage of the waveform reshaping circuit for reference signal generating purposes is basically constant, it is impossible to obtain a reference pulse signal of a desired duty cycle over a range of low to high speeds from the ac signal of the signal generator whose peak value varies with the engine speed.

In the case of the latter, the ac signal from the electromagnetic pickup includes a slope portion which varies sharply in one direction and another slope portion which varies gradually in the other direction, so that during for example the engine starting period where the engine speed is extremely low, the peak value of the ac signal from the electromagnetic pickup is reduced and the biases from the pump-up circuit are also reduced thus decreasing the difference between the gradually varying portion of the ac signal and the bias from the pump-up circuit. As a result, if a noise signal is superposed on the gradually varying portion of the ac signal due to the effect of the starter or the like during the engine starting, due to the bias from the pump-up circuit which increases to the maximum immediately after the transition and then decreases gradually, the noise signal, despite it being a whisker-like noise signal, is reshaped into a pulse signal of a certain time width by the waveform reshaping circuit and this pulse signal operates the ingition coil thus causing an erroneous ignition.

SUMMARY OF THE INVENTION

It is a first object of the invention to provide an ignition system for internal combustion engines in which the threshold voltage of a waveform reshaping circuit can be satisfactorily set to any desired value.

It is a second object of the invention to provide an ignition system for internal combustion engines which is capable of preventing any erroneous ignition even if a whisker-like noise signal is superposed on the gradually varying portion of an ac signal during the starting period of an engine.

To achieve the first object of this invention, the waveform reshaping circuit of an ignition system includs a capacitor charged up to a predetermined voltage, a discharging circuit for gradually discharging a charged voltage of the capacitor, a dc output generating circuit for detecting the charged voltage of the capacitor, a clamping circuit for clamping the dc output generated from the dc output generating circuit to a predetermined value, a feedback circuit for feeding the dc output clamped by the clamping circuit back to the waveform reshaping circuit, and a feedback cutoff circuit for stopping the feedback by the feedback circuit.

To achieve the second object of this invention, the waveform reshaping circuit includs a pump-up circuit responsive to leading-edge and trailing-edge transitions of the pulse signal from the waveform reshaping circuit to alternately feed back biases each increasing to a maximum immediately after one of said transitions and thereafter decreasing gradually and tending to aid said one transition, and bias disabling circuit for disabling one of the biases from the pump-up circuit during a starting period of the engine.

DESCRIPTION OF THE PREFERRED EMBODIMENTS

Figure 2:
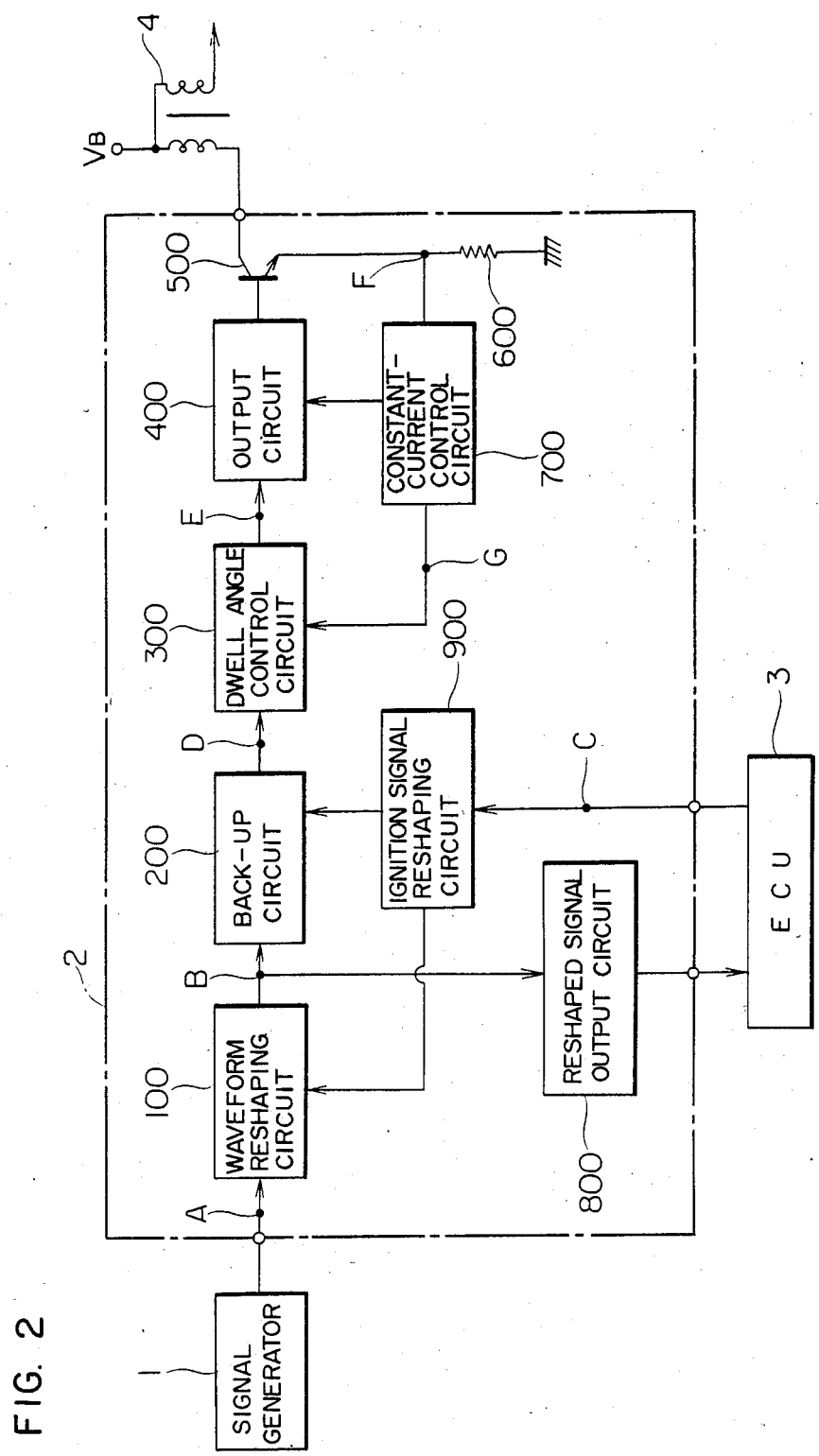
FIG. 2 is a block diagram showing an embodiment of the system according to the invention.

The present invention will now be described with reference to the illustrated embodiment. In FIG. 2 showing its overall block diagram, numeral 1 designates a signal generator including an electromagnetic pickup contained in the distributor which is not shown and generated in the pickup coil (not shown) of the signal generator 1 is a reference position signal shown at A in (1) of FIG. 4 which is periodically repeated at every top dead center position (TDC) of each cylinder and whose peak value increases with increase in the engine speed. The reference position signal includes an ac signal having a slope portion which varies sharply in one direction and another slope portion which varies slowly in the other direction. Numeral 2 designates an ignition unit including a waveform reshaping circuit 100 for reshaping the ac signal from the signal generator 1, a backup circuit 200 for making a decision as to which one of a reference pulse signal from the waveform reshaping circuit 100 and an output signal from an electric control unit (ECU) 3 is to be selected and sent to the following circuit and effecting the required switching, a dwell angle control circuit 300 for controlling the dwell time to optimize the dwell time of an ignition coil 4 in accordance with an output signal of the backup circuit 200, an output circuit 400 responsive to an output signal from the dwell angle control circuit 300 to control a power transistor 500, the power transistor 500 responsive to an output signal from the output circuit 400 to control the primary current in the ignition coil 4, a current detecting resistor 600 for detecting the primary current in the ignition coil 4, a constant-current control circuit 700 for maintaining the primary current value of the ignition coil 4 at a predetermined value when it is reached by the primary current, a reshaped signal output circuit 800 for supplying the reference pulse signal from the waveform reshaping circuit 100 to the ECU 300, and an ignition signal reshaping circuit 900 for supplying the output signal from the ECU 3 to the waveform reshaping circuit 100 and the backup circuit 200. The ECU 3 forms an electronic ignition timing control circuit which receives the reference pulse signal or the output signal of the waveform reshaping circuit 100 as its input signal so that the optimum ignition timing is computed and determined from the load condition, speed, cooling water temperature, etc., of the engine on the basis of the leading edge of the imput signal and also a dwell time slightly longer than the optimum dwell time determined by the ignition coil 4 is obtained by calculation thereby supplying it as a pulse signal determining the desired ignition timing and dwell time to the ignition unit 2. The ignition coil 4 produces a high voltage in its secondary winding when the power transistor 500 is turned off and the high voltage is applied to each spark plug through the distributor which is not shown. Designated at $V_B$ is a terminal connected to the positive terminal of the battery which is not shown.

Also, the ignition unit 2 and the ECU 3 are each contained as a unit in a case and these units are interconnected by lead wires.

The operation of the embodiment shown in FIG. 2 will now be described.

Figure 3:
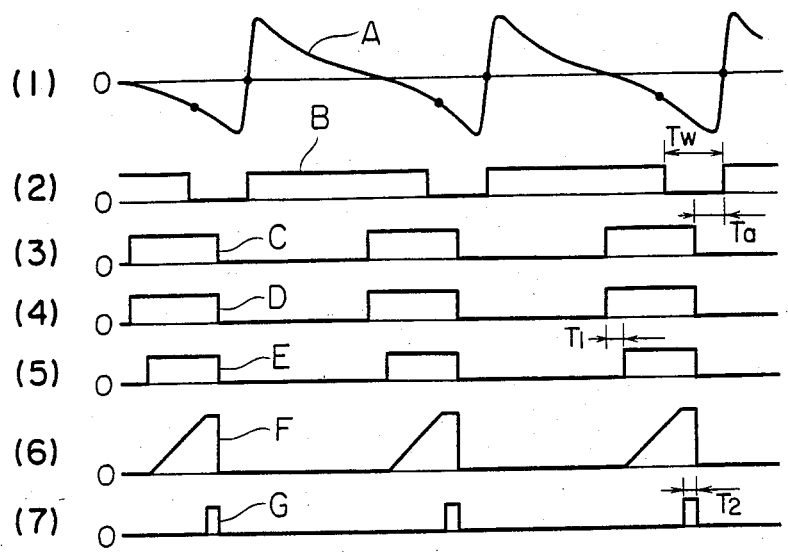
FIGS. 3 and 4 show various signal waveforms use useful for explaining the operation of the system shown in FIG. 2.

The overall operation of the embodiment will be described with reference to the various signal waveforms shown in FIGS. 3 and 4. The signal waveforms generated at the portions designated by symbols A to G in the block diagram of FIG. 2 are respectively shown at A to G in FIGS. 3 and 4, respectively. The operation will be first described with reference to FIG. 3 showing the signal waveforms at these portions during a steady-state operation of the engine. The ac signal A from the signal generator 1 is reshaped by the waveform reshaping circuit 100 whose output or a reference pulse signal B is supplied to the backup circuit 200 and to the ECU 3 through the reshaped signal output circuit 800. The ECU 3 computes and determines the optimum ignition timing from the load condition, speed, cooling water temperature, etc., of the engine on the basis of the negative transition corresponding to the leading edge of the reference pulse signal B applied from the waveform reshaping circuit 100 via the reshaped signal output circuit 800 and it also obtains by computation a dwell time slightly longer than the optimum dwell time determined by the ignition coil 4 thereby generating a pulse signal C indicative of the desired ignition timing and dwell time. The backup circuit 200 decides on the condition of the output signal C applied from the ECU 3 through the ignition signal reshaping circuit 900 so that if the condition of the signal C is determined as normal, the output signal C applied from the ECU 3 through the ignition signal reshaping circuit 900 is directly generated as its output signal D and supplied to the dwell angle control circuit 300. The dwell angle control circuit 300 generates a signal E for delaying the primary current flow starting time of the ignition coil 4 by a time $T_1$ from the time of the leading edge of the output signal D from the backup circuit 200 in accordance with a time $T_2$ (G in FIG. 3) during which the primary current of the ignition coil 4 is subjected to the constant-current control by the power transistor 500 and the signal E is applied to the output circuit 400. The output circuit 400 amplifies the output signal E of the dwell angle control circuit 300 to control the power transistor 500 and thereby control the primary current in the ignition coil 4. Then, the primary current (F in FIG. 3) in the ignition coil 4 is detected by the resistor 600 so that when the coil primary current reaches a predetermined value, the coil primary current is subjected to the constant-current control by the constant-current control circuit 700 and a pulse signal G indicative of the duration time of the constant-current control is fed back to the dwell angle control circuit 300 thereby effecting the optimum dwell angle control. In (2) of FIG. 3, symbol $T_W$ indicates a range of allowable advance angle degrees of the ignition timing which is determined by calculation by the ECU 3 and shown at C in (3) of FIG. 3 is the condition in which the ignition timing is advanced by Ta.

Figure 4:
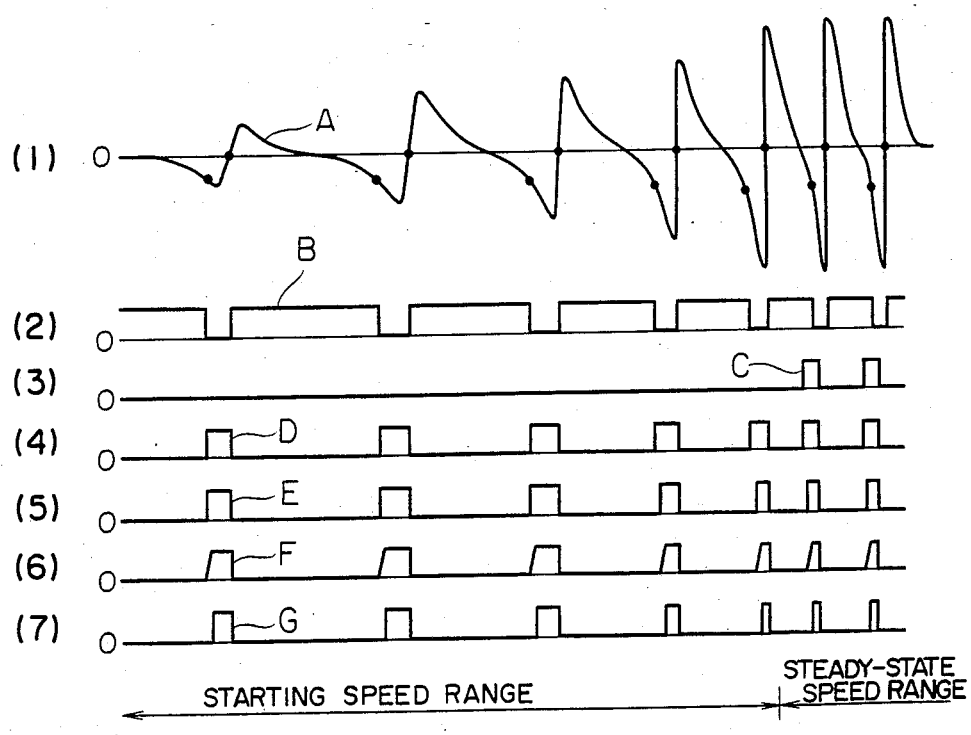

Next, the operation will be described with reference to FIG. 4 showing the signal waveforms at various portions during the engine starting period. Particularly, the difference from that in the steady-state speed range will be described. The ECU 3 determines the engine speed from the pulse period of the reference pulse signal B from the waveform reshaping circuit 2 so that no pulse signal is generated in a speed range (starting speed range) lower than a predetermined engine speed (e.g., 500 rpm) ((3) of FIG. 4). Thus, since the output signal C applied from the ECU 3 through the ignition signal reshaping circuit 900 is at a low level, the backup circuit 200 determines that the engine is in the starting operation and an inverted signal D of the reference pulse signal B from the waveform reshaping circuit 100 is applied to the dwell angle control circuit 300. The operation of the dwell angle control circuit 300 and the following is the same as in the case of FIG. 3. Also, in the steady-state speed range, if the output signal of the ECU 3 is caused to stay at the high level or the low level due to the damaging of the ECU 3 or the like, this is detected by the backup circuit 200 so that the reference pulse signal B from the waveform reshaping circuit 100 is applied to the dwell angle control circuit 300 thus preventing the ignition from being stopped.

Figure 1:
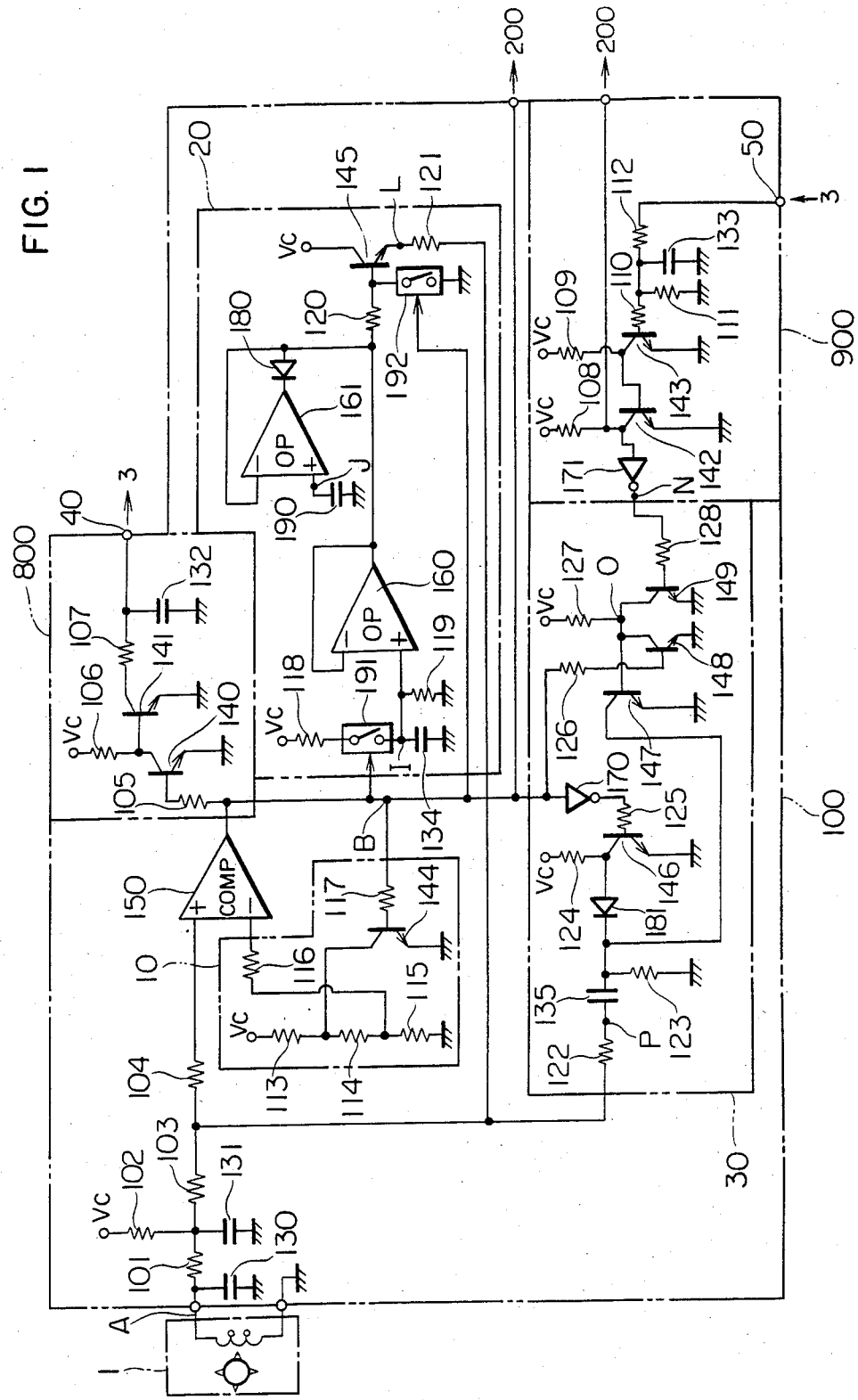
FIG. 1 is a detailed electric circuit diagram of the waveform reshaping circuit section in the system of the invention shown in FIG. 2.

Next, the circuit construction of the waveform reshaping circuit 100, the reshpaed signal output circuit 800 and the ignition signal reshaping circuit 900 of FIG. 1 will be described in detail.

Numerals 101 to 128 designate resistors, 130 to 135 capacitors, 140 to 149 transistors, 150 a comparator, 160 and 161 operational amplifiers, 170 and 171 inverters, 180 and 181 diodes and 190 a constant voltage source. A terminal 40 is an output terminal for applying a reshaped signal to the ECU 3 and a terminal 50 is an input terminal for receiving the output signal from the ECU 3. Numerals 191 and 192 designate analog switches whose on-off operations are controlled electrically and they may be replaced with transistors or the like. Numeral 10 designates a fixed hysteresis circuit for providing the operating level of the comparator 150 with a hysteresis characteristic, 20 a bias circuit for varying the threshold voltage for the output signal of the signal generator 1 in accordance with the engine speed, and 30 a pump-up circuit for increasing the noise withstanding capacity. Designated at $V_c$ is a terminal connected to the positive terminal of the constant voltage source which is not source.

With the construction described above, the operation of the waveform reshaping circuit 100, the reshaped signal output circuit 800 and the ignition signal reshaping circuit 900 will be described. The ac signal from the signal generator 1 is passed through a noise reducing filter including the capacitors 130 and 131 and the resistor 101 and the resistor 103, combined with an output voltage from the bias circuit 20 and an output voltage from the pump-up circuit 30 and then applied to the positive input of the comparator 150 via the resistor 104. Also, a voltage determined by the fixed hysteresis circuit 10 or a voltage obtained by dividing the voltage $V_c$ through the resistors 113, 114 and 115 is applied to the negative input of the comparator 150. In other words, when the output of the comparator 150 goes to a high level, the transistor 144 is turned on and the input voltage to the negative input of the comparator 150 is reduced substantially to zero volt. On the other hand, when the output of the comparator 150 goes to the low level, the transistor 144 is turned off and the input voltage to the negative input of the comparator 150 becomes one determined by the voltage division of the resistors 113, 114 and 115.

The bias circuit 20 will now be described. When the output signal of the comparator 150 goes to the low level, the analog switch 191 is turned on and the capacitor 134 is charged through the resistor 118 substantially to the voltage $V_c$. Then, when the output signal of the comparator 150 goes to be high level, the change stored in the capacitor 134 is discharged by the resistor 119 forming a discharging circuit. The terminal voltage waveform of the capacitor 134 which is charged and discharged according to the output of the comparator 150, is amplified by the operational amplifier 160 forming a dc output generating circuit and the resulting output of the operational amplifier 160 is clamped by a clamping circuit including the diode 180 and the operational amplifier 161 at a voltage determined by the voltage of the constant voltage source 190. When the output of the comparator 150 goes to the low level, the analog switch 192 forming a feedback cutoff circuit is turned on and the signal voltage clamped by the clamping circuit is reduced to a zero potential. When the output of the comparator 150 goes to the high level, the analog switch 192 is turned off so that the signal voltage clamped by the clamping circuit is fed back to the positive input circuit of the comparator 150 through the emitter-follower circuit of the transistor 145 forming a feedback circuit and the resistor 121.

Figure 5:
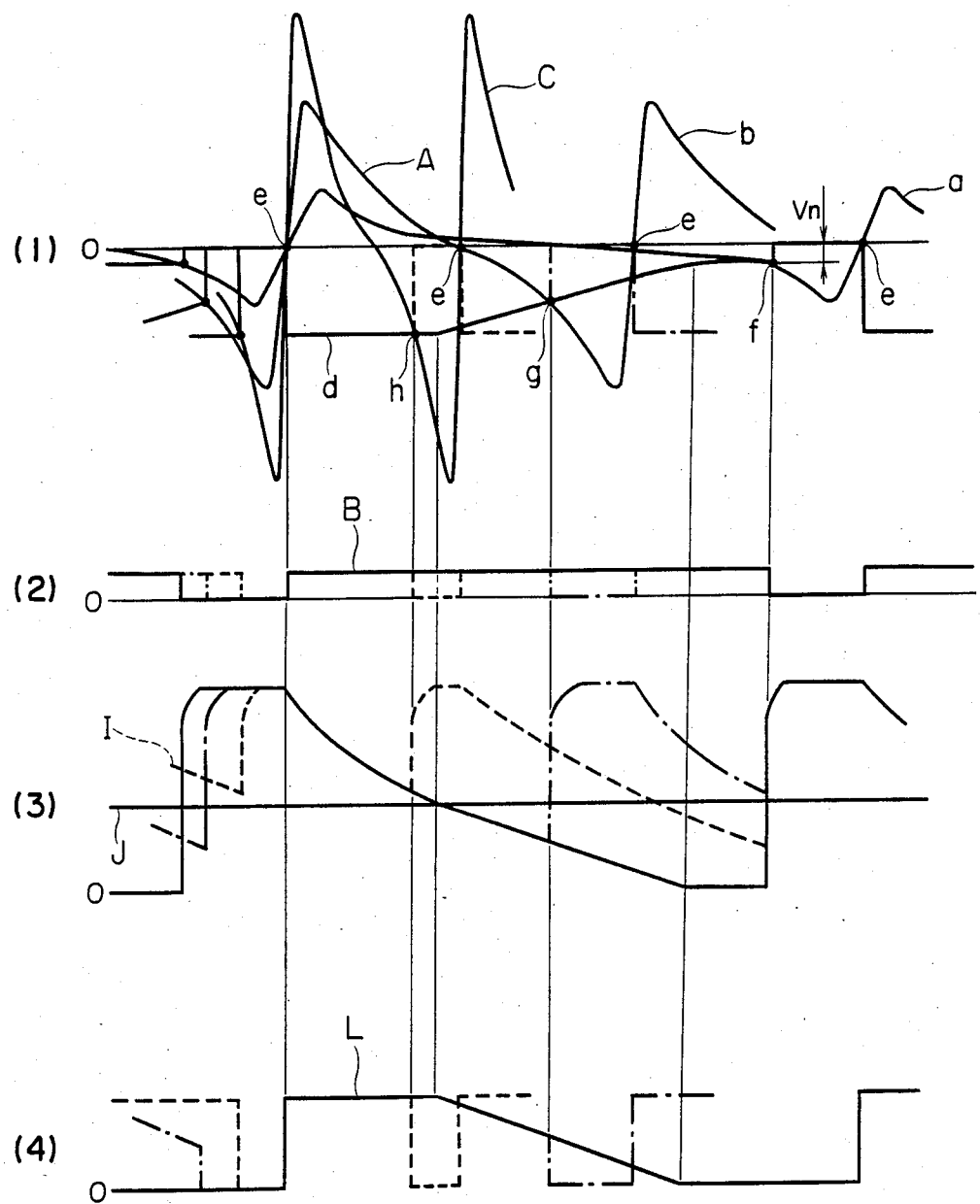
FIG. 5 shows various signal waveforms useful for explaining the operation of the bias circuit in the circuitry shown in FIG. 1.

The manner of performing the foregoing operation is shown in the waveform diagram of FIG. 5. In the Figure, it is assumed that no feedback is provided to the input from the pump-up circuit 30. Shown in (1) of FIG. 5 are the ac signal waveform from the signal generator 1 and the threshold voltage for the ac signal waveform. Shown at a is the ac signal voltage waveform from the signal generator 1 at very low speeds such as during the engine starting period, b the waveform at speeds slightly lower than the steady-state speed range anc c the waveform in the steady-state speed operation, respectively. Shown at d is the practical threshold voltage of the comparator 150 for the ac signal waveform from the signal generator 1, and e the reference positions (the TDC positions of the engine) at different speeds. Shown at f, g and h are the crossing points of the ac signal waveform from the signal generatotr 1 and the threshold voltage, that is, the points at which the output of the comparator 150 changes its state. Shown in (2) of FIG. 5 is the output signal waveform of the comparator 150, with the solid line corresponding to the waveform a in (1) of FIG. 5 and the dash-and-dot line and the dotted line respectively corresponding to the waveforms b and c in (1) of FIG. 5. In (3) of FIG. 5, symbol I designates the terminal voltage waveform of the capacitor 134 with the solid line, the dash-and-dot line and the dotted line respectively showing the waveforms at the respective speeds, and symbol J shows the clamping voltage for the waveform I. Shwon by the solid line, the dash-and-dot line and the dotted line in (4) of FIG. 5 is the output voltage waveform of the bias circuit 20 at the respective speeds. Also, shown at $V_h$ in (1) of FIG. 5 is the hysteresis voltage determined by the fixed hysteresis circuit 10.

Figure 6:
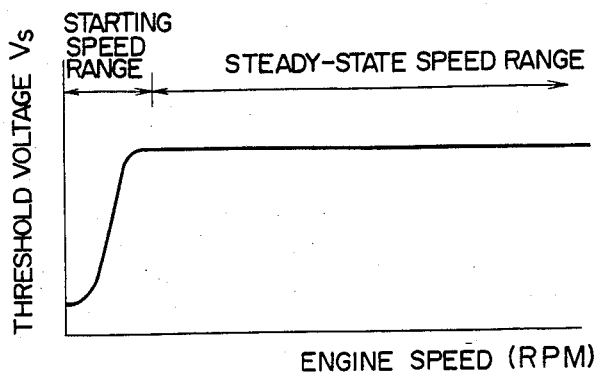
FIG. 6 is an engine speed-threshold voltage characteristic diagram of the biase circuit.

With these signal waveforms, the relation between the threshold voltage $V_s$ for the ac signal voltage from the signal generator 1 (the threshold voltage at the point of crossing by the ac signal waveform from the signal generator 1) and the engine speed N results in a characteristic in which the threshold voltage increases with increase in the engine speed in the starting speed range or very low speed range and the threshold voltage is maintained constant irrespective of the engine speed in the higher steady-state speed range as shown in FIG. 6.

Next, the operation of the pump-up circuit 30 and the other circuits will be described. The pulse signal from the ECU 3 is received at the terminal 50 and then the signal is applied to the base of the transistor 143 through a filter formed by the resistor 112 and the capacitor 133 thereby turning on and off the transistor 144 in accordance with the output pulse signal of the ECU 3. Thus, the transistor 142 is also turned on and off in response to the turning on and off of the transistor 143, so that a pulse signal synchronized with the output pulse signal of the ECU 3 is generated at the collector of the transistor 142 and this pulse signal is applied to the backup circuit 200 and to the pump-up circuit 30 through the inverter 171. The pump-up circuit 30 controls the on-off operation of the transistor 147 by passing the output pulse signal of the comparator 150 and the output pulse signal of the ECU 3 through a NOR circuit including the transistors 148 and 149. Also, the output signal of the comparator 150 is inverted by the inverter 170 to control the on-off operation of the transistor 146. When the transistor 146 is switched from an on-state to an off-state, if at this time the transistor 147 is off, the positive voltage is fed back as a bias voltage to the positive input circuit of the comparator 150 from the voltage supply $V_c$ through the resistor 124, the rectifying diode 181, the differentiating capacitor 135 and the resistor 122. When the transistor 146 is turned on and the transistor 147 is turned on, the charge stored in the differentiating capacitor 135 is discharged throught the transistor 147 and thus a negative voltage is fed back as a bias voltage to the positive input circuit of the comparator 150. In this case, if on the period of the transistor 147 is short so that the transistor 147 is turned off before the complete discharging of the charged stored in the capacitor 135, the stored charge of the capacitor 135 is continuously discharged through the resistor 123.

Figure 7:
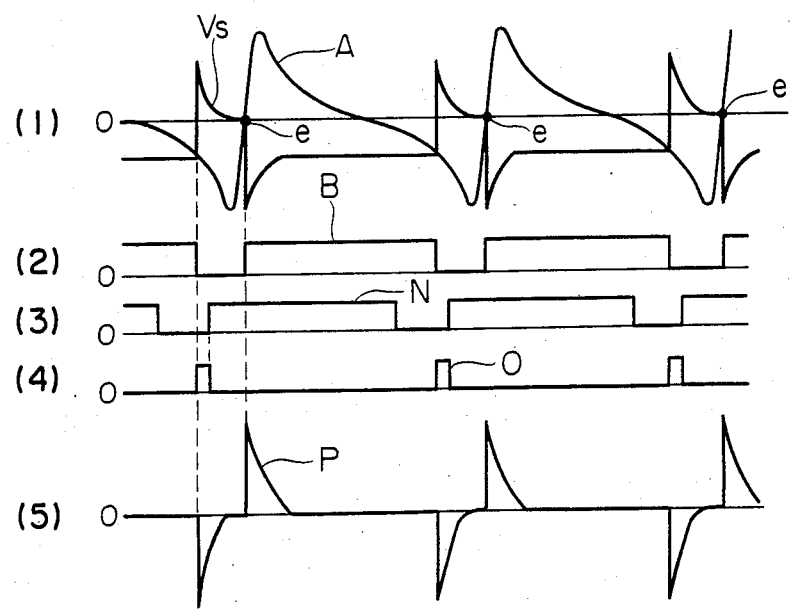
FIGS. 7 and 8 show various signal waveform useful for explaining the operation of the pump-up circuit in the circuitry shown in FIG. 1.
Figure 8:
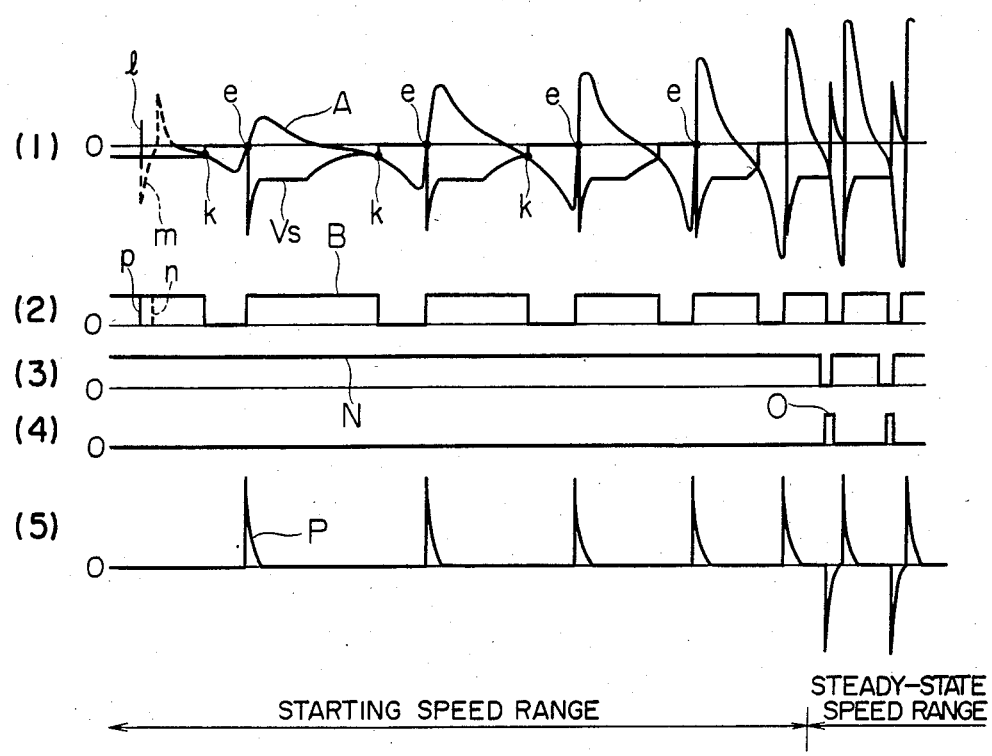

The waveform diagrams of FIGS. 7 and 8 show the manner in which the above-mentioned operation is effected. FIG. 7 shows the case in which the engine speed is in the steady-state speed range and FIG. 8 shows the case corresponding to the engine starting period. In the Figures, symbols A, B, N O and P indicates the waveforms generated respectively at the points of FIG. 1 designated by the same symbols, and in (1) of FIG. 7 and (1) of FIG. 8 symbol $V_s$ indicates the practical threshold voltage of the comparator 150 for the ac signal waveform from the signal generator 1. As will be seen from the Figures, in the steady-state speed range, when the output of the comparator 150 is switched from one state to another, a feedback is provided to the positive input of the comparator 150 from the pump-up circuit 30 so as to aid the switched state and in this way the noise margin for a noise signal to be superposed on the ac signal from the signal generator 1 is increased.

Also, during the engine starting period, a feedback is provided to the positive input of the comparator 150 from the pump-up circuit 30 only at each point e in (1) of FIG. 8 for the sharply varying slope portion of the ac signal from the signal generator 1 and no feedback is provided at each point k in (1) of FIG. 8 for the slowly varying slope portion of the ac signal from the signal generator 1. This is done for the following reason. During the starting period, where a noise signal is superposed on the ac signal from the signal generator 1 due to the effect of the starter magnet switch or the like (as shown at 1 in (1) of FIG. 8), if a feedback is provided at the point k, the threshold voltage becomes as shown by the broken line m in (1) of FIG. 8 and the resulting reshaped signal becomes as shown by the broken line n in (2) of FIG. 8. Thus, using the noise signal as a trigger, a reshaped pulse of a given pulse width is produced through the comparator 150. As a result, the pulse indicated by the broken line n in (2) of FIG. 8 represents the dwell time of the ignition coil 4 thus causing an erroneous firing. This problem is solved by the previously mentioned arrangement of the present embodiment. In other words, during the starting period, even if a noise signal is generated, the transistor 149 forming bias disabling means is continuously turned on so as to prevent the pump-up circuit 30 from providing any feedback and so the reshaped signal has a whisker-like shape as shown at p in (2) of FIG. 8. Thus, its time width is not sufficient to energize the ignition coil 4 and no erroneous firing is caused.

Figure 9:
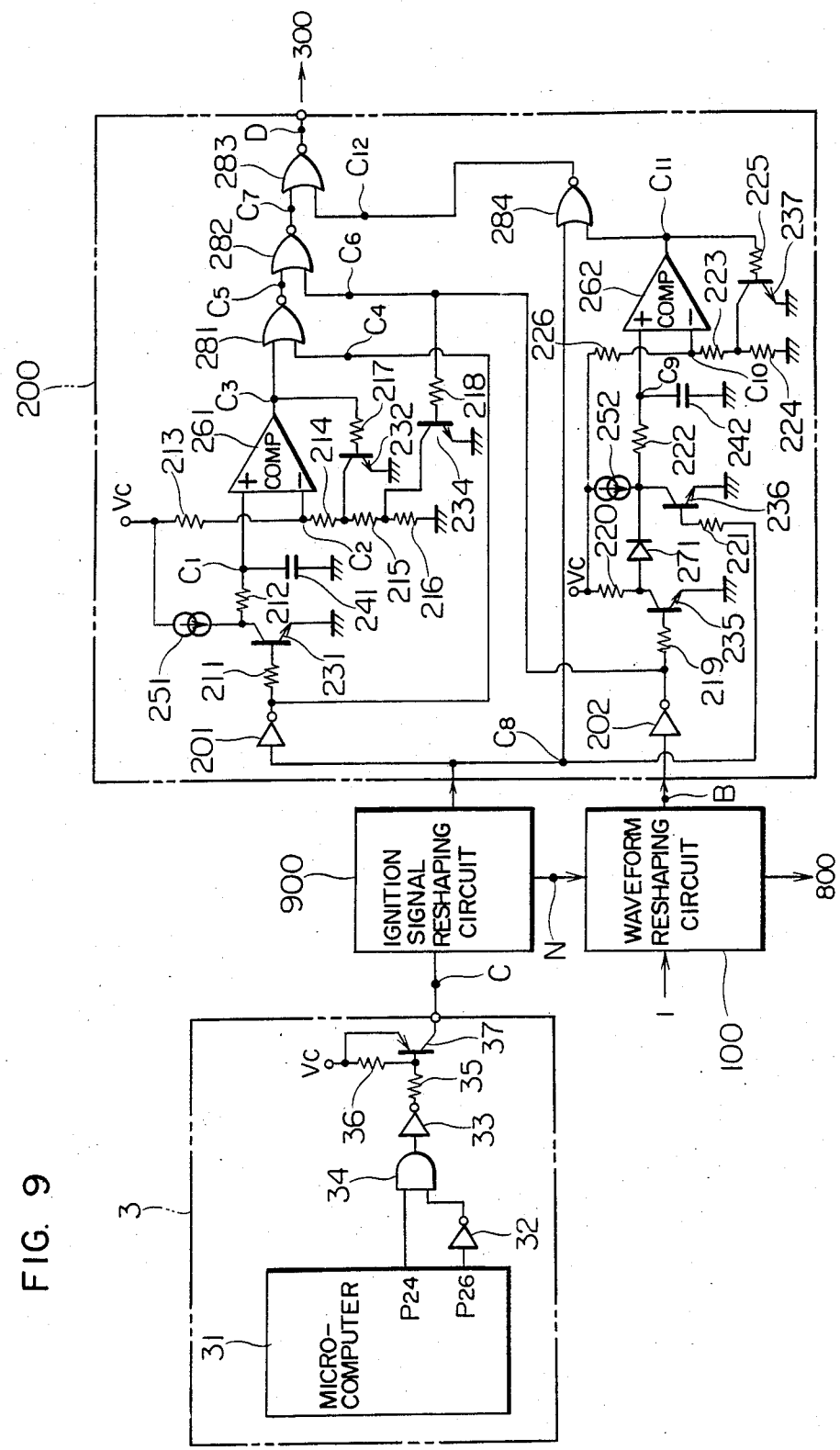
FIG. 9 is a detailed electric circuit diagram of the backup circuit section in the system of FIG. 2.

The backup circuit 200 and its peripheral circuits will now be described with reference to FIG. 9. In the Figure, the ECU 3 is represented by the circuit of its output section for generating its output signal and the circuit of its input section is not shown. Numeral 31 designates a microcomputer of the same type as disclosed in Japanese Unexamined Publication No. 195867/82 and its detailed description will be omitted. Numerals 32 and 33 designate inverters, 34 AND gate, 35 and 36 resistors, and 37 a transistor.

The output signal from the ECU 3 is reshaped by the ignition signal reshaping circuit 900 to supply a pulse signal to the backup circuit 200 and the waveform reshaping circuit 100, respectively. The waveform reshaping circuit 100 reshpaes the output signal of the signal generator 1 and supplies the resulting reference pulse signal to the backup circuit 200 and the reshaped signal output circuit 800, respectively. The backup circuit 200 reseives the pulse signals from the ignition signal reshapint circuit 900 and the waveform reshaping circuit 700 so as to select and supply one or the other of the two input signals to the dwell angle control circuit 300.

In the backup circuit 200, numerals 201 and 202 disignate inverters, 211 to 226 resistors, 231, 232 and 234 to 237 transistors, 241 and 242 capacitors, 251 and 252 current regulator circuits, 261 and 262 comparators, 271 a diode, and 281 to 284 NOR gates.

Figure 10:
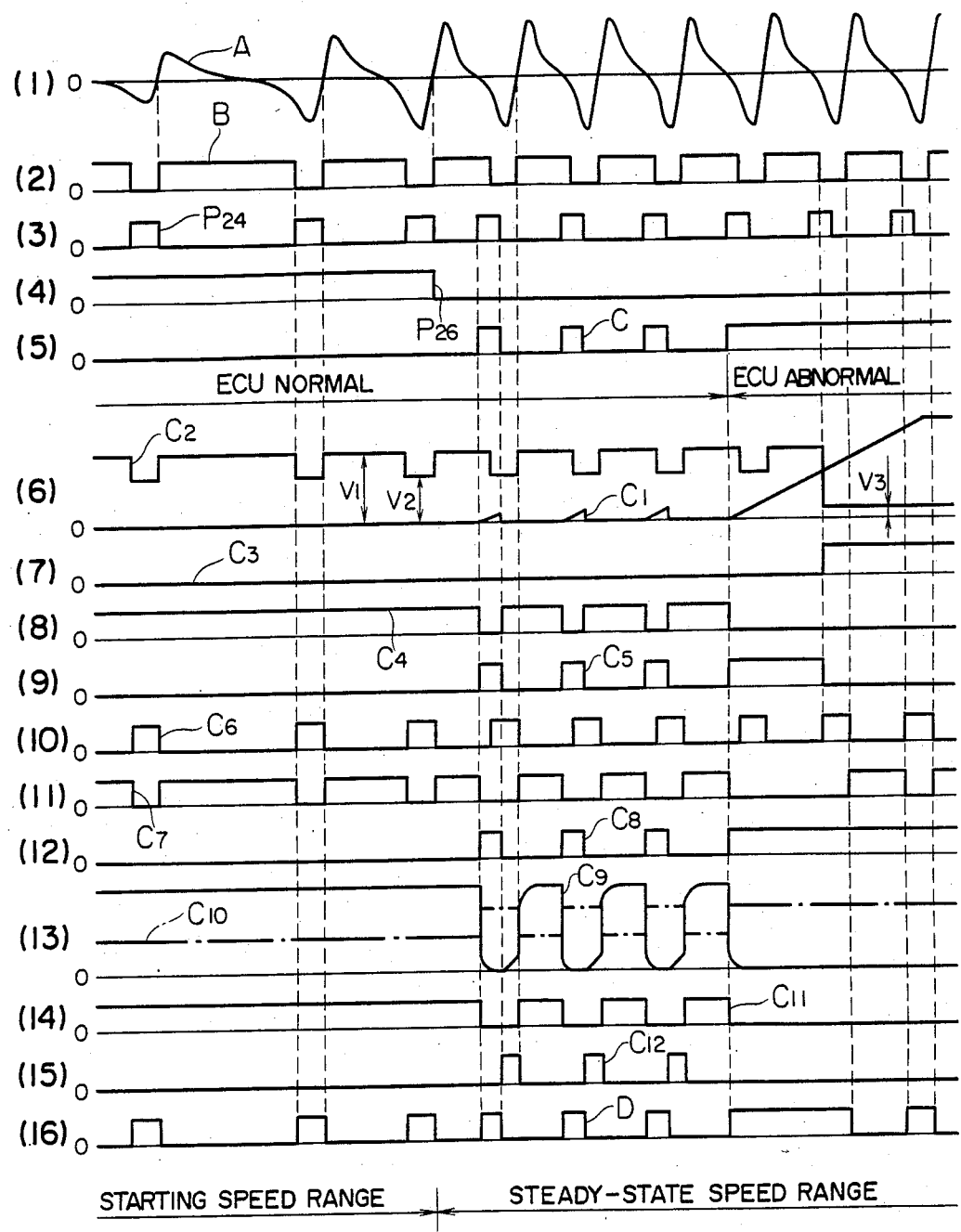
FIG. 10 shows various signal waveforms useful for explaining the operation of the backup circuit section shown in FIG. 9.

Next, the operation of the circuitry shown in FIG. 9 will be described with reference to the waveform diagram of FIG. 10. FIG. 10 shows the ac signal A from the signal generator 1 and the waveforms generated at the points of the same symbols as used in the circuit diagram of FIG. 9. The waveform reshaping circuit 100 reshapes the ac signal from the signal generator 1 and supplies the resulting reference pulse signal B as a reference position signal to the ECU 3 through the reshaped signal output circuit 800. Thus, in the ECU 3 the microcomputer 31 computes in terms of time the desired ignition timing and a dwell time slightly longer than the optimum dwell time of the ignition coil on the basis of the reference position signal and generates the resulting signal to a terminal $P_{24}$ of the microcomputer 31. Also, the microcomputer 31 computes the engine speed from the pulse period of the reference position signal and determines whether the engine speed is lower than a predetermined speed (e.g., 500 rpm) thus generating at a terminal $P_{26}$ of the microcomputer 31 a high level signal when the engine speed is lower than the predetermined speed and a low level signal when the engine speed is higher than the predetermined speed. The signal waveforms at the terminals $P_{24}$ and $P_{26}$ are respectively shown in (3) and (4) of FIG. 10. The AND gate 34 performs the AND operation on the inverted signal of the output signal $P_{26}$ from the inverter 32 and the output signal $P_{24}$ and an output signal C of the ECU 3 is applied to the ignition signal reshaping circuit 900 through the inverter 33 and the transistor 37. Shown in (5) of FIG. 10 is the waveform C in a normal condition where the output signal of the ECU 3 is normal and an abnormal condition where the output signal of the ECU 3 is abnormal. Here, the abnormal condition of the ECU 3 means such cases where the output transistor 37 of the ECU 3 is damaged by short-circuiting and in this abnormal mode the output signal is locked either at the high level or at the low level. In (5) of FIG. 10, the ECU abnormal condition indicated by the waveform C represents a case in which the output signal level is locked to the high level. The output signal of the ignition signal output circuit 900 is inverted by the inverter 201 (the waveform $C_4$ in (8) of FIG. 10) to control the on-off operation of the transistor 231. When the transistor 231 is turned on, the charge stored in the capacitor 241 is discharged (reset) through the resistor 212 and the transistor 231. When the transistor 231 is turned off, the capacitor 241 is charged with the constant current from the current regulator circuit 251 through the resistor 212 (the waveform $C_1$ in (6) of FIG. 10). The terminal voltage waveform of the capacitor 241 and a reference voltage are subjected to the operation of comparison and reshaping by the comparator 261. This reference voltage is obtained by dividing the voltage at the terminal $V_c$ connected to the constant voltage source by the resistance of the resistors 213, 214, 215 and 216 and the reference voltage becomes the voltage $V_1$, $V_2$ or $V_3$ in the waveform $C_2$ in (6) of FIG. 10 in dependence on the state of the transistor 231 whose on-off operation is controlled by the output signal of the comparator 261 and the state of the transistor 234 whose on-off operation is controlled by the reference pulse signal B from the waveform reshaping circuit 100. Here, the voltage $V_1$ results when both the transistors 232 and 234 are off, the voltage $V_2$ when the transistor 232 is off and the transistor 234 is on and the voltage $V_3$ when the transistor 232 is on irrespective of the on or off state of the transistor 234. The NOR gate 281 performs the NOR operation (the waveform $C_5$ in (9) of FIG. 10) on the output signal of the comparator 261 (the waveform $C_3$ in (7) of FIG. 10) and the inverted signal (the waveform $C_4$ in (8) of FIG. 10) of the output signal from the ignition signal reshaping circuit 900, and the NOR gate 282 performs the NOR operation on the output signal of the NOR gate 281 and the inverted signal (the waveform $C_6$ in (10) of FIG. 10) of the reference pulse signal B from the waveform reshaping circuit 100 through the inverter 202 thus generating a signal shown by the waveform $C_7$ in (11) of FIG. 10. When the transistor 235 whose on-off operation is controlled by the inverted signal (the waveform $C_6$ in (10) of FIG. 10) of the reference pulse signal B from the waveform reshaping circuit 100 through the inverter 202 is turned off, if the transistor 236 is off, the capacitor 242 is charged rapidly through the resistor 220, the diode 271 and the resistor 222. Then, when the transistor 236 whose on-off operation is controlled by the output signal of the ignition signal reshaping circuit 900 is turned on, the charge stored in the capacitor 242 is rapidly discharged (reset) through the resistor 222. It is to be noted that the transistor 235 is always turned on during the time that the transistor 236 is held on. Then, when the transistor 236 is turned off and the transistor 235 is turned on, the charging of the capacitor 242 is started with the constant current from the current regulator circuit 252 through the resistor 222. These conditions are shown by the waveform $C_9$ in (13) of FIG. 10. Then, the terminal voltage of the capacitor 242 and a reference voltage are subjected to the operation of comparison and reshaping by the comparator 262 and a signal shown as the waveform $C_{11}$ in (14) of FIG. 10 is generated. This reference voltage is the voltage obtained by dividing the voltage at the terminal $V_c$ through the resistors 226, 223 and 224 and it is provided with a hysteresis by the transistor 237 whose on-off operation is controlled by the output of the comparator 262. This reference voltage is shown by the dot-and-dash line in the waveform $C_{10}$ in (13) of FIG. 10. Then, the NOR gate 284 performs the NOR operation on the output signal of the comparator 262 and the output signal of the ignition signal reshaping circuit 900 (the waveform $C_8$ in (12) of FIG. 10) thus generating a signal shown as the waveform $C_{12}$ in (15) of FIG. 10, and the NOR gate 283 performs the NOR operation on the signal of the waveform $C_{12}$ and the signal of the waveform $C_7$ in (11) of FIG. 10. Thus, the signal of the waveform D in (16) of FIG. 10 is applied as an output signal of the backup circuit 200 to the dwell angle control circuit 300.

By virtue of the foregoing operation, in the starting speed range of the engine the backup circuit 200 selects the output signal of the waveform reshaping circuit 100 and applies it to the dwell angle control circuit 300. In other words, the ignition is effected at the ignition timing synchronized with the output signal of the signal generator 1.

Also, in the steady-state speed range the backup circuit 200 selects the output signal of the ECU 3 and applies it to the dwell angle control circuit 300. In other words, the ignition is effected at the ignition timing synchronized with the output signal of the ECU 3.

On the other hand, when the ECU 3 becomes faulty so that the output signal of the ECU 3 is locked at the high level, the backup circuit 200 selects the reference pulse signal from the waveform reshaping circuit 100 and applies it to the dwell angle control circuit 300 thus causing the ignition at the ignition timing synchronized with the output signal of the signal generator 1. Then, during the transition from the ignition condition synchronized with the output signal of the ECU 3 to the ignition synchronized with the reference pulse signal from the signal generator 1 due to the ECU malfunction, in the low speed range the transition is effected practically without causing any misfiring. In the high speed range, the transition is effected with the occurrence of misfiring several times and this degree of misfiring does not cause the engine to stop but allows the engine to operate continuously even if the ECU becomes faulty.

On the other hand, in the ECU faulty condition where the output signal of the ECU 3 is locked at the low level, the same occurs as in the case of the previously mentioned engine starting period so that the backup circuit 200 selects and supplies the reference pulse signal from the waveform reshaping circuit 100 to the dwell angle control circuit 300. As a result, the ignition is effected at the ignition timing synchronized with the output signal of the signal generator 1. In this case, the transition from the ignition synchronized with the output signal of the ECU 3 to the ignition synchronized with the reference pulse signal from the signal generator 1 due to the ECU malfunction is effected without causing any misfiring.

As described hereinabove, the backup circuit 200 discriminates circuitwise the state of the output signal of the ECU 3 and selects the output signal of the ECU 3 or the reference pulse signal from the waveform reshaping circuit 100 for generation as its output signal. Also, when making a transition from one mode selecting the reference pulse signal from the waveform reshaping circuit 100 to another mode selecting the output signal of the ECU 3 or vice versa, if the engine is in operation, the ignition is effected in synchronism with either the reference pulse signal from the waveform reshaping circuit 100 or the output signal of the ECU 3. In other words, there is no danger of the ignition being effected at any abnormal timing during the transition.

While, in the above-described embodiment, a signal is used whose leading and trailing edges respectively correspond to the negative-going and positive-going transitions of reference pulse signals from the waveform reshaping circuit 100, a signal whose leading and trailing edges respectively correspond to the positive-going and negative-going transitions of the reference pulse signal is of course used if the waveform reshaping circuit is so constructed that the positive-going transition of tis reference pulse signal is shifted in an ignition advancing direction with increase in the engine speed.

Further, while, in the above-described embodiment, the invention is applied to a system in which the computation of ignition timing and dwell time is effected by the ECU 3, the invention is also applicable to one in which the phase of an ac signal generated from the signal generator 1 is mechanically controlled by the conventional centrifugal and vacuum advance mechanisms so that the pulse signal from the waveform reshaping circuit 100 is directly supplied as an ignition signal to the dwell angle control circuit 300 without using the ECU 3, the backup circuit 200, the reshaped signal output circuit 800 and the ignition signal reshaping circuit 900.

Still further, while, in the above-described embodiment, the engine speed is detected so that the transistor 149 is operated during the engine starting period, the transistor 149 may be operatively associated with the starter switch or the like so as to operate it during the engine starting period.

We claim:

1. An ignition system for an internal combustion engine comprising:
   a signal generator for generating, in synchronism with rotation of an engine, an ac signal including a slope portion sharply varying in one direction and another slope portion varying slowly in the other direction;
   a waveform reshaping circuit for reshaping the waveform of the ac signal from said signal generator to generate a pulse signal; and
   an ignition coil responsive to the pulse signal from said waveform reshaping circuit to switch on and off the flow of a primary current therethrough,
   said waveform reshaping circuit including a pump-up circuit responsive to leading-edge and trailing-edge transitions of the pulse signal from said waveform reshaping circuit to alternately feed back biases each increasing to a maximum immediately after one of said transitions and thereafter decreasing gradually and tending to aid said one transition, and bias disabling means for disabling, during a starting period of said engine, one of the biases from said pump-up circuit associated with the transition of the pulse signal from said waveform reshaping circuit corresponding to the slowly varying slope portion of the ac signal from said signal generator.

2. An ignition system for an internal combustion engine comprising:
   a signal generator for generating an ac signal periodically repeated at a predetermined rotational position of each cylinder of an engine in synchronism with rotation thereof;
   a waveform reshaping circuit for reshaping the waveform of the ac signal from said signal generator to generate a reference pulse signal having a leading edge shifted in an ignition timing advancing direction with increase in the speed of said engine; and
   an electronic ignition timing control circuit for receiving the reference pulse signal from said waveform reshaping circuit to electronically control the timing of ignition on the basis of the leading edge of said reference pulse signal,
   said waveform reshaping circuit including a capacitor adapted to be charged up to a predetermined voltage during an interval of time between the leading edge and a trailing edge of the reference pulse signal from said waveform reshaping circuit, a discharging circuit for gradually discharging a charged voltage of said capacitor in response to the trailing edge of the reference pulse signal from said waveform reshaping circuit, a dc output generating circuit for detecting the charged voltage of said capacitor to generate a dc output corresponding thereto, a clamping circuit for clamping the dc output generated from said dc output generating circuit to a predetermined value, a feedback circuit for feeding said dc output clamped by said clamping circuit back to an input side of said waveform reshaping circuit, and a feedback cutoff circuit for stopping the feedback by said feedback circuit during the interval of time between the leading and trailing edges of the reference pulse signal from said waveform reshaping circuit.

3. An ignition system for an internal combustion engine comprising:
   a signal generator for generating an ac signal periodically repeated at a predetermined rotational position of each cylinder of an engine in synchronism with rotation thereof;
   a waveform reshaping circuit for reshaping the waveform of the ac signal from said signal generator to generate a reference pulse signal having a leading edge shifted in an ignition timing advancing direction with increase in the speed of said engine; and
   an electronic ignition timing control circuit for receiving the reference pulse signal from said waveform reshaping circuit to electronically control the timing of ignition on the basis of the leading edge of said reference pulse signal,
   said waveform reshaping circuit including a comparator for receiving the ac signal from said signal generator to generate an output reference pulse signal of said waveform reshaping circuit, a capacitor adapted to be charged up to a predetermined voltage during an interval of time between the leading edge and a trailing edge of the reference pulse signal from said comparator, a discharging circuit for gradually discharging a charged voltage of said capacitor in response to the trailing edge of the reference pulse signal from said comparator, a dc output generating circuit for detecting the charged voltage of said capacitor to generate a dc output corresponding thereto, a clamping circuit for clamping the dc output generated from said dc output generating circuit to a predetermined value, a feedback circuit for feeding said dc output clamped by said clamping circuit circuit back to an input side of said comparator, a feedback cutoff circuit for stopping the feedback by said feedback circuit during the interval of time between the leading and trailing edges of the reference pulse signal from said comparator, a fixed hysteresis circuit for providing an operating level of said comparator with a hysteresis characteristic, and a pump-up circuit responsive to leading-edge and trailingedge transitions of the reference pulse signal from said comparator to apply to the input side of said comparator biases each thereof increasing to a maximum immediately after one of said transitions and thereafter decreasing gradually and tending to aid said one transition.

4. An ignition system for an internal combustion engine comprising:
   a signal generator for generating an ac signal periodically repeated at a predetermined rotational position of each cylinder of an engine in synchronism with rotation thereof;

a waveform reshaping circuit for reshaping the waveform of the ac signal from said signal generator to generate a reference pulse signal having a leading edge shifted in an ignition timing advancing direction with increase in the speed of said engine;

an electronic ignition timing control circuit for receiving the reference pulse signal from said waveform reshaping circuit to electronically control the timing of ignition on the basis of the leading edge of said reference pulse signal; and a backup circuit for receiving the reference pulse signal from said waveform reshaping circuit and an output signal of said electronic ignition timing control circuit whereby when a pulse signal is generated from said electronic ignition timing control circuit simultaneously with the reference pulse signal from said waveform reshaping circuit said pulse pulse signal from said electronic ignition timing control circuit is selected as an ignition signal, whereas the reference pulse signal from said waveform reshaping circuit is selected as an ignition signal when an output signal of said electronic ignition timing control circuit is maintained continuously at a low or high level at the time of generation of the reference pulse signal from said waveform reshaping circuit, said waveform reshaping circuit including a capacitor adapted to be charged up to a predetermined voltage during an interval of time between the leading edge and a trailing edge of the reference pulse signal from said waveform reshaping circuit, a discharging circuit for discharging a charged voltage of said capacitor in response to the trailing edge of the reference pulse signal from said waveform reshaping circuit, a dc output generating circuit for detecting the charged voltage of said capacitor to generate a dc output corresponding thereto, a clamping circuit for clamping said dc output generated from said dc output generating circuit to a predetermined value, a feedback circuit for feeding said dc output clamped by said clamping circuit back to an input side of said waveform reshaping circuit, and a feedback cutoff circuit for stopping the feedback by said feedback circuit during the interval of time between the leading and trailing edges of the reference pulse signal from said waveform reshaping circuit.

* * * * *